(12) United States Patent
Wahlström

(10) Patent No.: US 12,209,522 B2
(45) Date of Patent: Jan. 28, 2025

(54) EXHAUST AFTERTREATMENT SYSTEM (EATS)

(71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/322,276

(22) Filed: May 23, 2023

(65) Prior Publication Data
US 2023/0383683 A1 Nov. 30, 2023

(30) Foreign Application Priority Data

May 25, 2022 (EP) .................................. 22175489

(51) Int. Cl.
*F01N 3/021* (2006.01)
*F01N 3/20* (2006.01)
*F01N 3/28* (2006.01)

(52) U.S. Cl.
CPC ......... *F01N 3/2066* (2013.01); *F01N 3/0217* (2013.01); *F01N 3/2803* (2013.01); *F01N 2450/30* (2013.01)

(58) Field of Classification Search
CPC ...... F01N 3/2066; F01N 3/208; F01N 3/2803; F01N 3/0217; F01N 3/021; F01N 3/035; F01N 13/0093; F01N 2450/30; F01N 2590/08; Y02T 10/12
See application file for complete search history.

(56) References Cited

U.S. PATENT DOCUMENTS

| 8,646,259 | B2 | 2/2014 | Gonze et al. |
| 2021/0123366 | A1* | 4/2021 | Robel ............... F01N 3/0885 |
| 2021/0180494 | A1 | 6/2021 | Moore et al. |

FOREIGN PATENT DOCUMENTS

| CN | 108952898 | * | 12/2018 |
| DE | 102018102239 | * | 8/2018 |
| DE | 102020007553 A1 | | 3/2021 |

(Continued)

OTHER PUBLICATIONS

Extended European Search Report in corresponding European Application No. 22175489.8 dated Nov. 15, 2022 (5 pages).

*Primary Examiner* — Phutthiwat Wongwian
*Assistant Examiner* — Diem T Tran
(74) *Attorney, Agent, or Firm* — Venable LLP; Jeffri A. Kaminski

(57) ABSTRACT

An Exhaust Aftertreatment System (EATS) arrangement includes a housing, a pre-SCR insert, a PF insert, a first main SCR insert and an exhaust pipe. The pre-SCR insert, the PF insert and the first main SCR insert are arranged in the housing and are each removably mounted in the housing such that each insert may be removed separately from the housing, the pre-SCR insert being mounted along a first geometric axis, the PF insert being mounted along a second geometric axis and the first main SCR insert is mounted along a third geometric axis, the first geometric axis being parallel with the second geometric axis and the third geometric axis is parallel with the first and the second geometric axes or coincides with either one of the first and the second geometric axis and is parallel with the other one of the first and the second geometric axis.

14 Claims, 4 Drawing Sheets

(56) References Cited

FOREIGN PATENT DOCUMENTS

| | | | |
|---|---|---|---|
| EP | 2143899 | * | 1/2010 |
| EP | 3699407 B1 | | 2/2022 |
| FR | 3098854 A1 | | 1/2021 |
| KR | 1020170005932 | * | 1/2017 |
| WO | 2014008930 A1 | | 1/2014 |
| WO | 2014084537 A1 | | 6/2014 |
| WO | WO-2014192183 | * | 12/2014 |
| WO | 2021104604 A1 | | 6/2021 |
| WO | 2021225824 A1 | | 11/2021 |

* cited by examiner

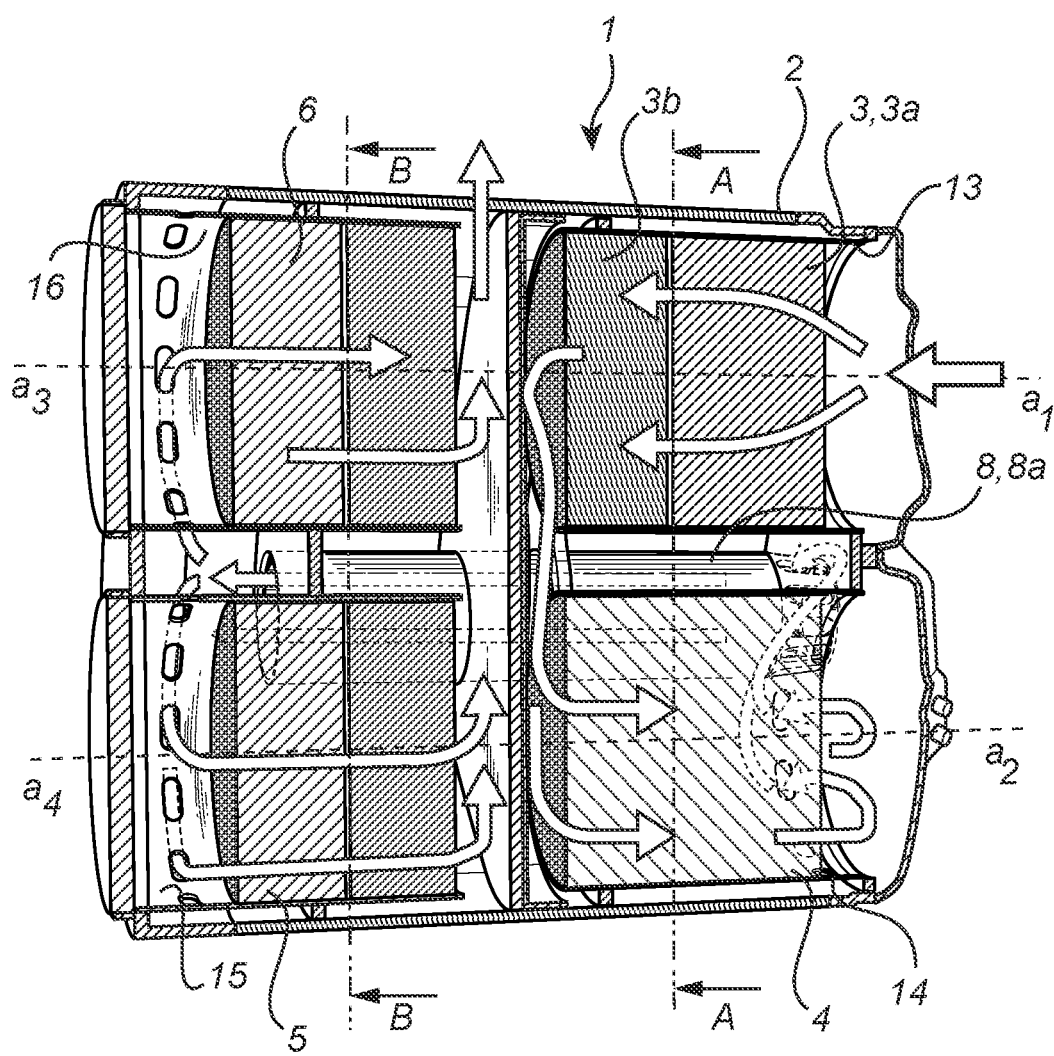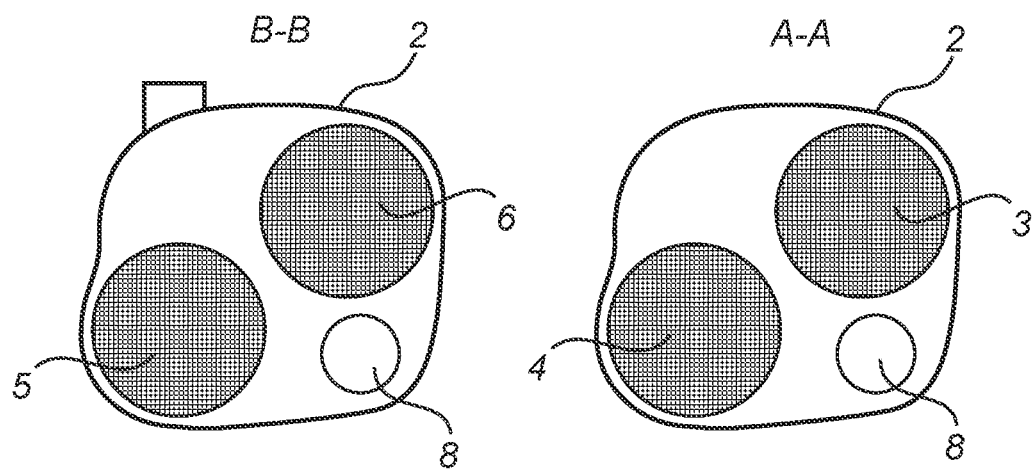
Fig. 4

EXHAUST AFTERTREATMENT SYSTEM (EATS)

TECHNICAL FIELD

The present invention relates to an Exhaust Aftertreatment system (EATS). The invention also relates to a vehicle comprising such EATS.

BACKGROUND

Today, in order to fulfill current emission legislation, more or less all vehicles with an Internal Combustion Engine (ICE) are provided with an Exhaust gas Aftertreatment System (EATS) comprising a catalytic converter.

In such EATS arrangements a selective catalytic reduction system (SCR) is generally used. These systems use liquid reducing agents such as ammonia, urea, and the like. The reducing agent is sprayed into the SCR through a nozzle, or the like, and a chemical reaction is provided between the exhaust from the engine and the reductant, which reduces the amount of NOx ultimately discharged from the EATS. The EATS may furthermore include a Particular Filter (PF), such as a Diesel Particular Filter (DPF) for reducing the particulate matter emissions from the engine exhaust gases. The EATS generally consists of a tubular, longitudinal body with an inlet and an outlet, wherein the inlet is arranged on the exhaust side of the ICE, for receiving exhaust gas emissions from the ICE, and an outlet is arranged for discharging exhaust gas emissions treated in the catalytic converter. The inlet is in flow communication with the outlet.

The next step in emission legislation (EuroVII) for trucks and busses adds very strict requirements on the aftertreatment system for reducing very small particulates (PN10) and gaseous emissions like NOx. There is also a desire to improve the acoustic performance of the EATS-muffler.

Several technologies have been proposed for meeting the new requirements, including highly efficient particulate filter(s), dual SCR-systems with dual urea dosing and electrical heaters. For best acoustic performance and for meeting packaging constraints, these components are normally integrated into the Exhaust Aftertreatment Muffler (EATS-muffler). These components are all expensive and are also subject for ageing and deterioration over time.

In view of the above, it is an object of the present disclosure to provide a compact EATS arrangements with an improved space optimization and an improved maintenance to prolong the lifetime in an easy and cost-efficient manner.

SUMMARY

It is an object of the present disclosure to provide an EATS arrangement that at least partially overcomes the above-described deficiencies.

According to a first aspect, there is provided an Exhaust Aftertreatment System (EATS) arrangement comprising a housing, a pre-SCR (Selective Catalytic Reduction) insert, a PF (Particulate Filter) insert, a first main SCR insert and an exhaust pipe, the pre-SCR insert being arranged to receive exhaust gas entering the EATS arrangement, the PF insert being arranged downstream the pre-SCR insert and the first main SCR insert being arranged downstream the PF insert, wherein the pre-SCR insert, the PF insert and the first main SCR insert are arranged in the housing and are each removably mounted in the housing such that each insert may be removed separately from the housing, the pre-SCR insert being mounted along a first geometric axis, the PF insert being mounted along a second geometric axis and the first main SCR insert is mounted along a third geometric axis, the first geometric axis being parallel with the second geometric axis and the third geometric axis is parallel with the first and the second geometric axis or alternatively coincides with either one of the first and the second geometric axis and is parallel with the other one of the first and the second geometric axis.

The next step in emission legislation (EuroVII) for trucks and busses adds very strict requirements on the aftertreatment system for reducing very small particulates (PN10) and gaseous emissions like NOx. There will also be increased requirements on in-use measurements and fulfilment as well as longer durability requirement. It is therefore an important advantage that the individual inserts can be individually maintained or exchanged in the EATS according to the present disclosure in a cost-efficient and easy manner.

Furthermore, to fulfil the requirements, larger and more components which need to be at certain positions in relation to each other are required in the EATS arrangement. The EATS arrangement according to the present disclosure meets the contradictory requirement of tight integration inside the EATS-housing while enabling maintainability and separate exchange of the inserts.

The Particulate Filter (PF) may optionally be a Diesel Particular Filter (DPF). The EATS arrangement may comprise a second main SCR insert being arranged in parallel with the first main SCR insert, the second main SCR insert being separately removably mounted in the housing. Such arrangement provides the EATS arrangement with an enhanced nitrogen oxide converting capacity having a tight integration inside the EATS-housing while still allowing removal and insertion of the inserts.

The second main SCR insert is mounted along a fourth geometric axis, the fourth geometric axis being parallel with the third geometric axis. Such arrangement enables an enhanced nitrogen oxide converting capacity while improving the space optimization and the maintenance of the inserts in a cost efficient and easy manner.

The third geometric axis may coincide with the second geometric axis and the fourth geometric axis may coincide with the first geometric axis. Such arrangement enables an enhanced nitrogen oxide converting capacity while improving the space optimization and the maintenance of the inserts in a cost efficient and easy manner.

Optionally, an Oxidation Catalyst (OC), such as a Diesel Oxidation Catalyst (DOC), may be integrated with the pre-SCR insert, such that it is removably mounted in the housing together with the pre-SCR insert and removed separately from the housing as one insert with the pre-SCR insert. Alternatively, an Ammonium Slip Catalyst (ASC) may be integrated with the pre-SCR insert, such that it is removably mounted in the housing together with the pre-SCR insert and removed separately from the housing as one insert with the pre-SCR insert.

Optionally, an OC unit, such as a DOC unit, may be integrated with the PF insert, such that it is removably mounted in the housing together with the PF insert and removed separately from the housing as one insert with the PF insert.

The first and/or second main SCR insert may each include a plurality of SCR units, such as a second SCR unit being arranged downstream a first SCR unit in the first and/or second main SCR insert. Alternatively, or additionally, the first and/or second main SCR insert may include a respective ASC, arranged downstream the first and/or second SCR units in the first and/or second main SCR insert.

One or more, optionally each one, of the pre-SCR insert, the PF insert, the first main SCR insert and if present the second main SCR insert, is removably mounted by a respective clamp, such as a clamp comprising an encircling band having an adjustable circumference.

The pre-SCR insert, the PF insert, the first main SCR insert and, if present, the second main SCR insert, may be arranged at a respective wall section of the housing and each one of the respective wall sections is an openable wall section, allowing access to the respective inserts.

The pre-SCR insert, the PF insert, the first main SCR insert and, if present, the second main SCR insert, may each be removably mounted to a respective wall section of the housing.

A first reductant injector, such as a urea injector may be positioned in the exhaust pipe, upstream the EATS arrangement. A second reductant injector, such as a urea injector, may be arranged upstream the first main SCR insert.

The housing may comprise a first heater, such as an electrical heater, being removably mounted in the housing.

The pre-SCR insert may comprise a lid, the heater being positioned upstream the pre-SCR insert and wherein the heater is mounted to the lid and is removable from the EATS arrangement as one unit with the lid.

The housing may comprise a second heater, such as an electrical heater, being removably mounted in the housing.

The PF insert may comprise a lid the heater being positioned downstream the PF insert and wherein the heater is mounted to the lid and is removable from the EATS arrangement as one unit with the lid.

Alternatively, the heater(s) may be removably mounted to the housing with a respective clamp.

Each one of the pre-SCR insert, the PF insert, the first main SCR insert and, if present, the second main SCR insert may have the same diameter, or at least a diameter which does not differ more than ±10% from the diameters of each one of the other inserts, as measured perpendicular to the geometric axis along which the respective insert is mounted. This provides a uniform arrangement enabling a tight fitting of the housing around the respective insert, as seen in the transverse direction of the EATS.

The pre-SCR insert and the PF insert may have the same length, or at least a length which does not differ more than ±20% from the length of the other insert, as measured along the geometric axis along which the respective insert is mounted. This provides a uniform arrangement enabling a tight fitting of the housing around the respective insert, as seen in the longitudinal direction of the EATS.

The EATS may comprise a second main SCR and where the first main SCR insert and the second main SCR insert may have the same length, or at least a length which does not differ more than ±10% from the length of the other insert, as measured along the geometric axis along which the respective insert is mounted.

According to a second aspect, the present disclosure relates to a vehicle comprising an EATS arrangement according to the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 4 shows a cross section of the EATS according to the present invention including the flow direction of the exhaust gas.

DETAIL DESCRIPTION

Figure 1:
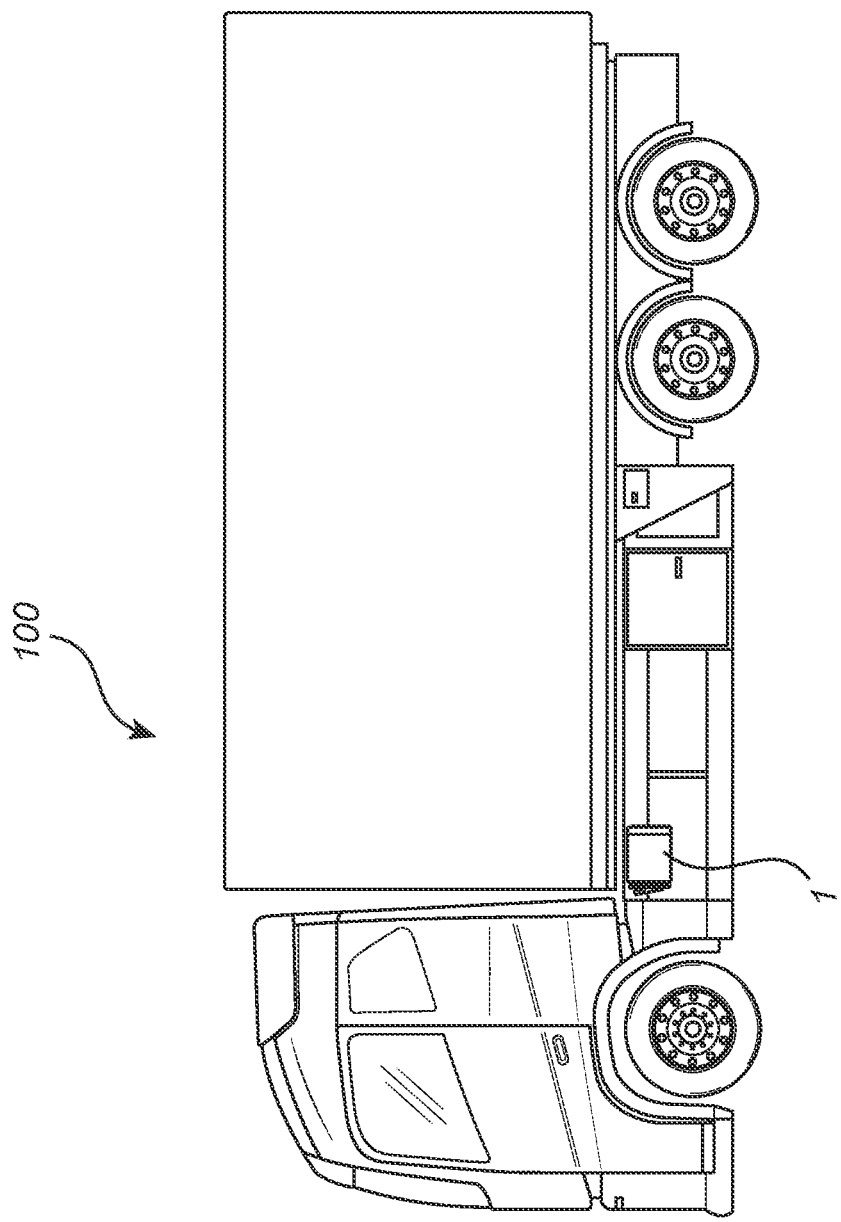
FIG. 1 is a side view of a vehicle comprising an Exhaust gas after Treatment System (EATS) according to an example of the present invention.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 100 comprising an exhaust after treatment system (EATS) 1, according to one example of the present invention, and a combustion engine (not shown), such as an internal combustion engine, arranged upstream of, and fluidly connected to, the EATS 1. The vehicle 100 depicted in FIG. 1 is a truck 100 for which the inventive concept which will be described in detail below, is suitable for.

Figure 2:
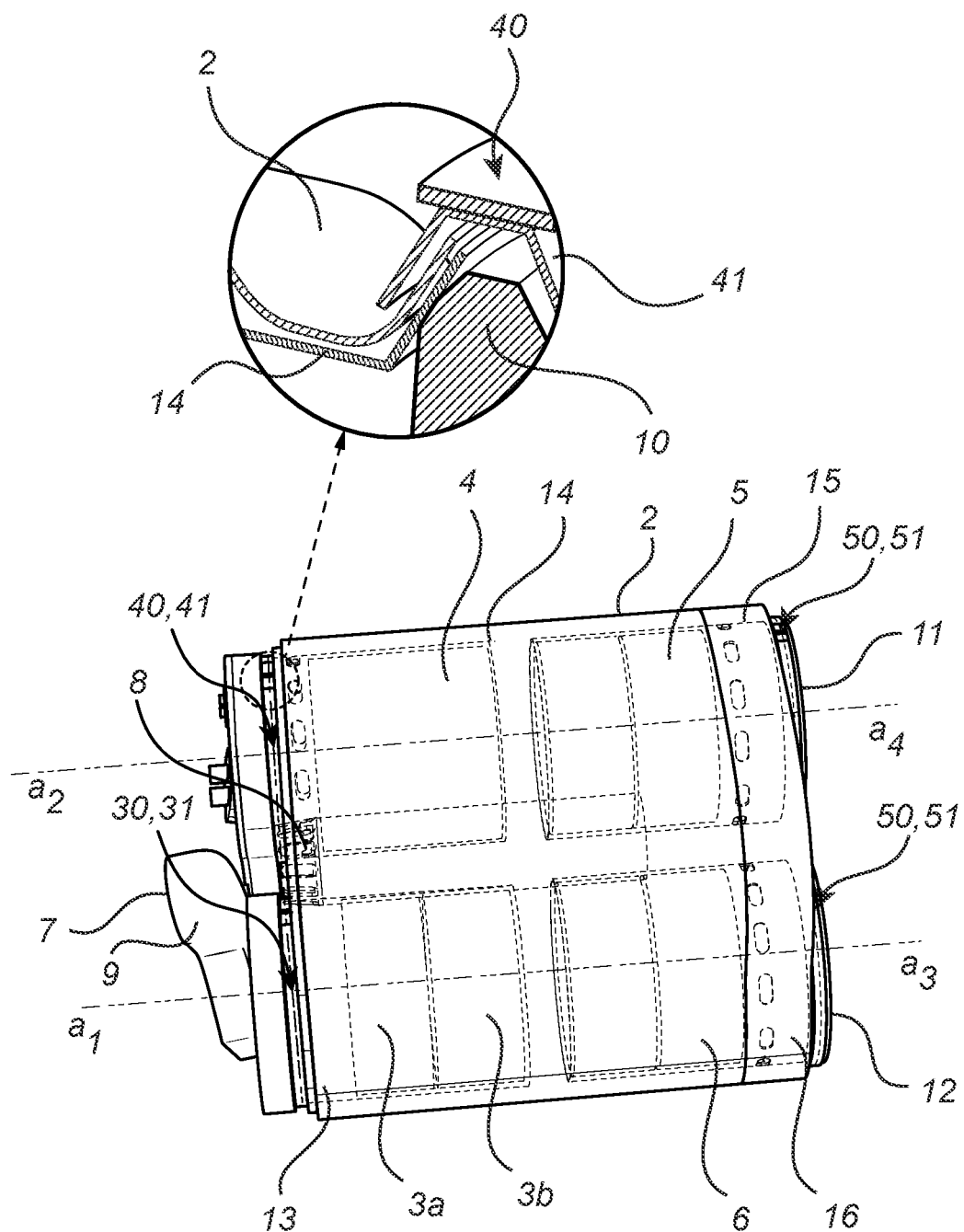
FIG. 2 is a schematic sideview of an EATS according to an example of the present invention.

FIG. 2 shows a schematic sideview of an EATS 1 in accordance with one embodiment of the invention. In the non-limiting example of FIG. 2, the EATS arrangement 1 comprises a housing 2, a pre-SCR (Selective Catalytic Reduction) insert 3, a PF (Particulate Filter) insert 4, a first main SCR insert 5, a second main SCR insert 6 and an exhaust pipe 7. The pre-SCR insert 3 is arranged to receive exhaust gas entering the EATS arrangement 1 and the PF insert 4 is arranged downstream the pre-SCR insert 3. A first reductant injector (not shown), such as a urea injector, may be positioned in the exhaust pipe, upstream the EATS arrangement.

The first and the second main SCR inserts 5,6 are arranged in parallel and downstream the PF insert 4. A second reductant injector 8, such as a urea injector, is arranged upstream the first main SCR insert.

The pre-SCR insert 3, the PF insert 4 and the first and the second main SCR inserts 5,6 are arranged in the housing 2 and are each removably mounted in the housing 2 such that each insert may be removed separately from the housing 2. The respective insert 3,4,5,6 is provided with a respective lid 9,10,11,12 to enable opening and removal of the inserts 3,4,5,6 separately. This is an optional feature to the EATS 1 and in an alternative embodiment the inserts 3,4,5,6 are arranged at a respective wall section of the housing and each one of the respective wall sections is an openable wall section, allowing access to the respective inserts.

In this embodiment the pre-SCR insert 3, in addition to a pre-SCR unit 3a, comprises an Oxidation Catalyst (OC) 3b for oxidizing carbon monoxide, hydrocarbons and diesel particulate matters to $CO_2$ and $H_2O$, such as a Diesel Oxidation Catalyst (DOC). The OC 3b is integrated in the pre-SCR insert 3 such that it is removably mounted in the housing 2 together with the pre-SCR unit 3a and removed separately from the housing 2 as one insert with the pre-SCR insert 3. This is however an optional feature to the EATS arrangement of the present disclosure. Alternatively, to an OC unit, the pre-SCR unit may comprise an Ammonium Slip Catalyst (ASC) being integrated with the pre-SCR insert, such that it is removably mounted in the housing together with the pre-SCR insert and removed separately from the housing as one insert with the pre-SCR insert.

The pre-SCR insert 3 is mounted along a first geometric axis a1, the PF insert 4 is mounted along a second geometric axis a2, the first main SCR insert is mounted along a third geometric axis a3 and the second main SCR insert is mounted along a fourth geometric axis a4. The first geometric axis a1 is parallel with the second geometric axis a2 and the third geometric axis a3 is parallel with the fourth geometrical axis a4.

In this embodiment, the first geometric axis a1 furthermore coincides with the fourth geometric axis a4 and the second geometric axis a2 coincides with the third geometric axis a3, thus providing a tight integration of the inserts inside the EATS-housing 2 while still allowing removal and insertion of the inserts separately.

The pre-SCR insert 3 is arranged in a pre-SCR insert cylinder 13 within the housing 2, the OC insert 4 is arranged in an OC insert cylinder 14 within the housing 2 and the first and second main SCR inserts 5,6 are also arranged in a respective first and second main SCR insert cylinder 15,16 within the housing 2.

The respective insert 3,4,5,6 within their respective cylinder 13,14,15,16 is removably mounted with a respective clamp 30,40,50,60, securing the inserts 3,4,5,6 to the housing 2. The clamps 30,40,50,60 in FIG. 2 each comprises an encircling band having a circumference that is adjustable with a screw, a further alternative is an excenter lock. The clamps 30,40,50,60 thus secures an external portion of the respective insert 3,4,5,6 by means of a frictional force resulting from the tightening of the respective clamp 30,40, 50,60. A gasket 31,41,51,61 is arranged between the respective clamp 30,40,50,60 and the respective insert 3,4,5,6 within their respective cylinder 13,14,15,16 to provide sealing of the housing 2. The inserts 3,4,5,6 may alternatively be removably attached to the housing via a bolted flange joint.

Figure 3:
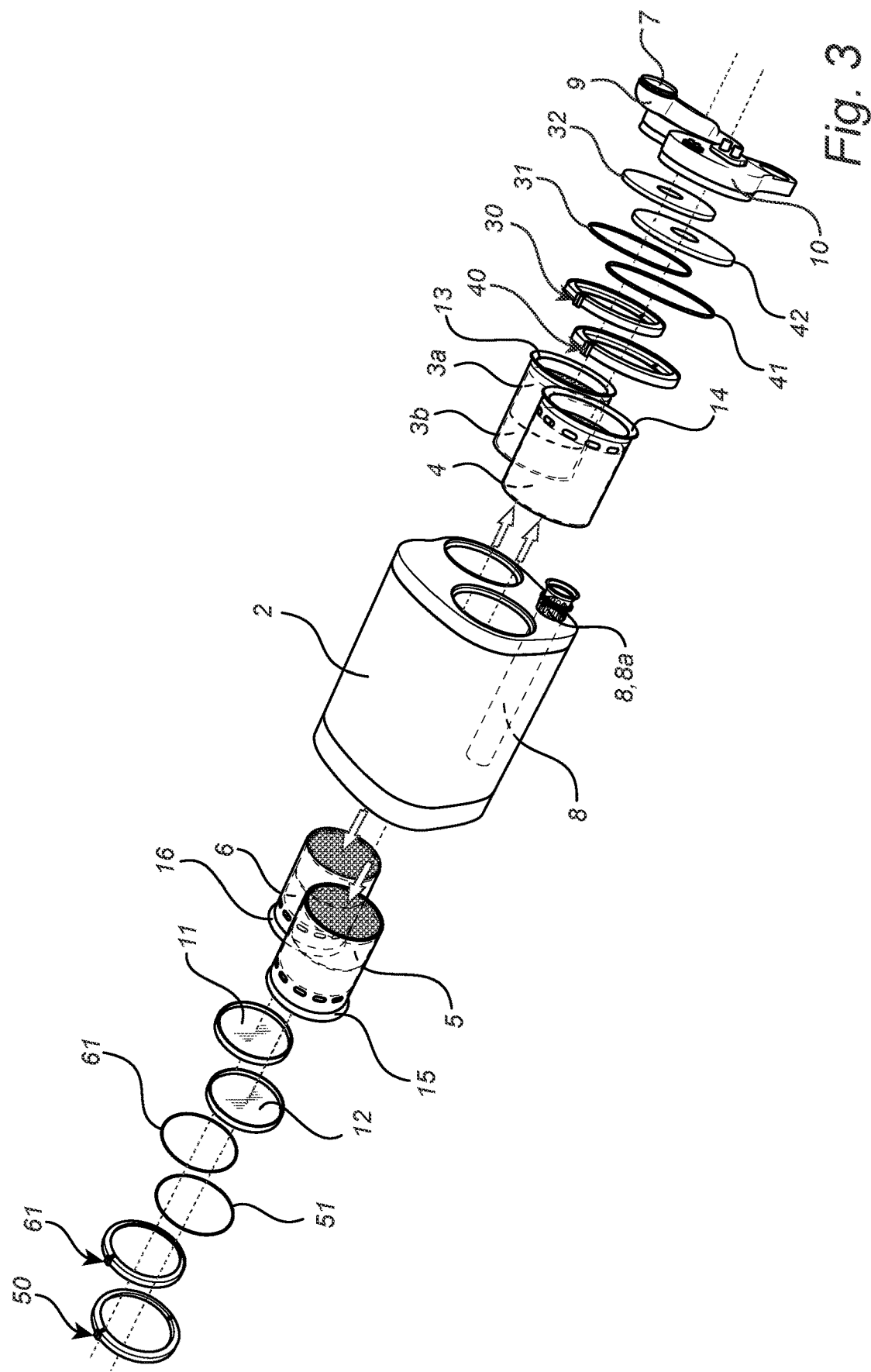
FIG. 3 shows a sideview of the EATS according to FIG. 2 with the EATS inserts being separately removed from the EATS.

By removing or opening of the respective lid 9,10,11,12 and releasing of the respective clamp 30,40,50,60 each of the pre-SCR (Selective Catalytic Reduction) insert 3, the PF (Particulate Filter) insert 4, the first main SCR insert 5, the second main SCR insert 6 may be separately removed from the housing 2, such as for maintenance or exchange, as illustrated in FIG. 3.

The EATS arrangement 1 may, as illustrated in FIG. 3, may comprise one or more electrical heaters 32,42 removably mounted in the housing 2. In FIG. 3, a first electrical heater 32 is arranged upstream the pre-SCR 3 and a second electrical heater 42 is arranged downstream the PF insert 4. The first and second heaters 32,42 may optionally be mounted by a respective clamp or alternatively be mounted onto the respective lid 9,10, such that they are removable from the housing 2 as one unit with the lid 9,10.

FIG. 4 is a cross-sectional view of the EATS arrangement 1 shown in FIGS. 2 and 3 and illustrates the exhaust gas flow. When the internal combustion engine (not shown) is running, exhaust gas exhausted from the engine passes through the exhaust pipe 7 in a flow direction indicated by the arrows in FIG. 4. The pre-SCR 3 is located close to the inlet of the exhaust pipe 7. Downstream the catalyst 3, the PF 4 is provided for removing diesel particulate matter or soot from the exhaust gas. Downstream the PF 4, a reductant injector 8 is arranged for introducing a fluid reductant, such as urea, into a reductant mixpipe 8a. Optionally, a swirl mixer is provided for mixing the fluid reductant with the exhaust gas in the reductant mixpipe 8a.

The first and second main SCR inserts 5,6 are arranged downstream the reductant injector 8. The liquid reductant is stored in a tank (not shown) and pressurized by a pump (not shown). The pump is controlled so as to adjust the amount of liquid reductant injected so that a proper amount is added to the exhaust gas flow depending on the operation conditions of the engine (shown in FIG. 1).

It is to be understood that the present invention is not limited to the embodiments described above and illustrated in the drawings; rather, the skilled person will recognize that many changes and modifications may be made within the scope of the appended claims. For example, the EATS may be used for cleaning exhaust gases of other engines than diesel engines. For example, the present EATS may be used to clean exhaust gases, e.g. by converting NOx emissions, from the exhaust of internal combustion engines using petrol, CNG (Compressed Natural Gas), LPG (Liquified Pressurized Gas), DME (DiMethylEther), and/or H2 (Hydrogen) as fuel. Thus, the engine system may comprise another combustion engine than a diesel engine, e.g. a hydrogen engine.

The invention claimed is:

1. An Exhaust Aftertreatment System (EATS) comprising a housing, a pre-SCR (Selective Catalytic Reduction) insert, a PF (Particulate Filter) insert, a first main SCR insert and an exhaust pipe, the pre-SCR insert being arranged to receive exhaust gas entering the EATS, the PF insert being arranged downstream the pre-SCR insert and the first main SCR insert being arranged downstream the PF insert, wherein the pre-SCR insert, the PF insert and the first main SCR insert are arranged in the housing and each of them is removably mounted in the housing such that each insert is separately removable from the housing, the housing being a common housing for the pre-SCR insert, the PF insert and the first main SCR insert, the pre-SCR insert being mounted along a first geometric axis, the PF insert being mounted along a second geometric axis and the first main SCR insert is mounted along a third geometric axis, the first geometric axis being parallel with the second geometric axis and the third geometric axis is parallel with the first and the second geometric axes or alternatively coincides with either one of the first and the second geometric axis and is parallel with the other one of the first and the second geometric axis and wherein each one of the pre-SCR insert, the PF insert, and the first main SCR insert is removably mounted by a respective clamp.

2. The EATS according to claim 1, wherein the EATS comprises a second main SCR insert being arranged in parallel with the first main SCR insert, the second main SCR insert being separately removably mounted in the housing.

3. The EATS according to claim 2, wherein the second main SCR insert is mounted along a fourth geometric axis, the fourth geometric axis being parallel with the third geometric axis.

4. The EATS according to claim 3, wherein the third geometric axis coincides with the second geometric axis and the fourth geometric axis coincides with the first geometric axis.

5. The EATS according to claim 1, wherein the pre-SCR insert, the PF insert, and the first main SCR insert are each arranged at a respective wall section of the housing and each one of the respective wall sections is an openable wall section, allowing access to the respective inserts.

6. The EATS according to claim 1, wherein the pre-SCR insert, the PF insert, and the first main SCR insert are each removably mounted to a respective wall section of the housing.

7. The EATS according to claim 1, wherein the housing comprises a first electrical heater being removably mounted in the housing.

8. The EATS according to claim 7, wherein the pre-SCR insert comprises a lid, the first electrical heater being positioned upstream the pre-SCR insert and wherein the first electrical heater is mounted to the lid and is removable from the EATS as one insert with the lid.

9. The EATS according to claim 7, wherein the housing comprises a second electrical heater being removably mounted in the housing.

10. The EATS according to claim 9, wherein the PF insert comprises a lid, the second electrical heater being positioned downstream the PF insert and wherein the second electrical heater is mounted to the lid and is removable from the EATS as one insert with the lid.

11. The EATS according to claim 1, wherein each one of the pre-SCR insert, the PF insert, the first main SCR insert and if present a second main SCR insert has the same diameter, or at least a diameter which does not differ more than ±10% from the diameters of each one of the other inserts as measured perpendicular to the geometric axis along which the respective insert is mounted.

12. The EATS according to claim 1, wherein the pre-SCR insert and the PF insert has the same length, or at least a length which does not differ more than ±20% from the length of the other insert, as measured along the geometric axis along which the respective insert is mounted.

13. The EATS according to claim 1, wherein the EATS comprises a second main SCR and where the first main SCR insert and the second main SCR insert has the same length, or at least a length which does not differ more than ±10% from the length of the other insert, as measured along the geometric axis along which the respective insert is mounted.

14. A vehicle comprising an EATS according to claim 1.

* * * * *